US008595409B2

(12) United States Patent
Kim et al.

(10) Patent No.: US 8,595,409 B2
(45) Date of Patent: Nov. 26, 2013

(54) APPARATUS AND METHOD FOR REORGANIZATION OF MAPPING INFORMATION IN FLASH MEMORY

(75) Inventors: Jin-kyu Kim, Seoul (KR); Kyoung-il Bang, Suwon-si (KR); Song-ho Yoon, Yongin-si (KR); Kwang-yoon Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 946 days.

(21) Appl. No.: 11/774,198

(22) Filed: Jul. 6, 2007

(65) Prior Publication Data

US 2008/0071971 A1    Mar. 20, 2008

(30) Foreign Application Priority Data

Sep. 20, 2006    (KR) .................. 10-2006-0091361

(51) Int. Cl.
*G06F 12/02*    (2006.01)

(52) U.S. Cl.
USPC .................................. 711/103; 711/E12.008

(58) Field of Classification Search
None
See application file for complete search history.

(56) References Cited

U.S. PATENT DOCUMENTS

| | | | | |
|---|---|---|---|---|
| 5,963,983 A * | 10/1999 | Sakakura et al. | ............. | 711/202 |
| 6,282,605 B1 * | 8/2001 | Moore | ............. | 711/103 |
| 6,711,663 B2 * | 3/2004 | Lai et al. | ............. | 711/206 |
| 7,711,923 B2 * | 5/2010 | Rogers et al. | ............. | 711/206 |
| 2003/0041210 A1 * | 2/2003 | Keays | ............. | 711/103 |
| 2003/0165076 A1 * | 9/2003 | Gorobets et al. | ............. | 365/200 |
| 2005/0273551 A1 * | 12/2005 | Keays | ............. | 711/103 |
| 2006/0020747 A1 * | 1/2006 | Estakhri et al. | ............. | 711/103 |
| 2007/0016721 A1 * | 1/2007 | Gay | ............. | 711/103 |
| 2007/0233941 A1 * | 10/2007 | Lee et al. | ............. | 711/103 |
| 2007/0300037 A1 * | 12/2007 | Rogers et al. | ............. | 711/202 |
| 2008/0282045 A1 * | 11/2008 | Biswas et al. | ............. | 711/159 |

FOREIGN PATENT DOCUMENTS

| | | |
|---|---|---|
| JP | 09-212411 A | 8/1997 |
| JP | 2000-020391 A | 1/2000 |
| KR | 1999-0075161 A | 10/1999 |
| KR | 1020030040817 A | 5/2003 |

* cited by examiner

*Primary Examiner* — Charles Rones
*Assistant Examiner* — Ryan Dare
(74) *Attorney, Agent, or Firm* — Sughrue Mion, PLLC (57) ABSTRACT

An apparatus and method for reorganizing mapping information in a flash memory are provided. The apparatus includes a sector-managing module that secures a mapping sector where mapping information is recorded in a physical unit, and determines whether user data is recorded up to a sector located in a predetermined position, and a mapping-information-recording module that records the mapping information in the mapping sector according to a result of the determination. Here, the mapping information includes a relation of a physical sector storing the user data and a logical sector corresponding to the physical sector.

20 Claims, 10 Drawing Sheets

FIG. 8

APPARATUS AND METHOD FOR REORGANIZATION OF MAPPING INFORMATION IN FLASH MEMORY

CROSS-REFERENCE TO RELATED APPLICATIONS

This application claims priority from Korean Patent Application No. 10-2006-0091361 filed on Sep. 20, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to reorganization of mapping information in a flash memory, and more particularly, to a fast reorganization in a flash memory, which can reduce a time spent for a mapping reorganization by reducing accesses needed to reorganize physical and logical sectors located in a flash memory when the flash memory is initialized.

2. Description of the Related Art

Digital devices such as digital cameras, mobile phones, personal digital assistants (PDAs) are now in widespread use.

The popularity of a flash memory as a storage device of the portable digital device is increasing due to its low-power, integrity, high-function, physical safety, and portability. Especially, as the capacity of the flash memory is enlarged, the flash memory is increasingly being used as a replacement for disk drives.

The flash memory performs an erase-before-write operation.

When a write operation is performed to a sector, the erase-before-write operation erases a block in which the sector belongs, and then performs a write operation.

Thus, the operation in the flash memory consumes more time for input/output operations than in a hard disk which can perform overlapping operations on the sector.

After performing approximately one hundred thousand erase operations, the block of the flash memory cannot perform further erase operations.

Accordingly, the erase operation shortens the life of the flash memory.

Due to this characteristic, when the write operation is performed in a specific sector of the flash memory, the flash memory searches for an empty area in the allocated block, or allocates a block that requires few erase operations in order to perform the write operation. The software to enable this characteristic is called the flash translation layer (FTL), which performs a function of mapping a logical sector address of the file system to a physical sector address of the flash memory.

An FTL algorithm minimizes the erase operation, and prevents the erase operation from being centralized to a single block.

Mapping used in the FTL algorithm is divided into sector mapping, block mapping, and hybrid mapping. The sector mapping maps a physical sector and logical sector by creating a mapping table having sector units. The block mapping maps a physical block and a logical block. The hybrid mapping uses the two aforementioned mapping methods, which can exploit the advantages of the two mapping methods.

The mapping table is mainly stored in the main memory of the system to be referred to in real-time, but it is also stored in the flash memory for the situation where the power is lost.

Figure 1A:
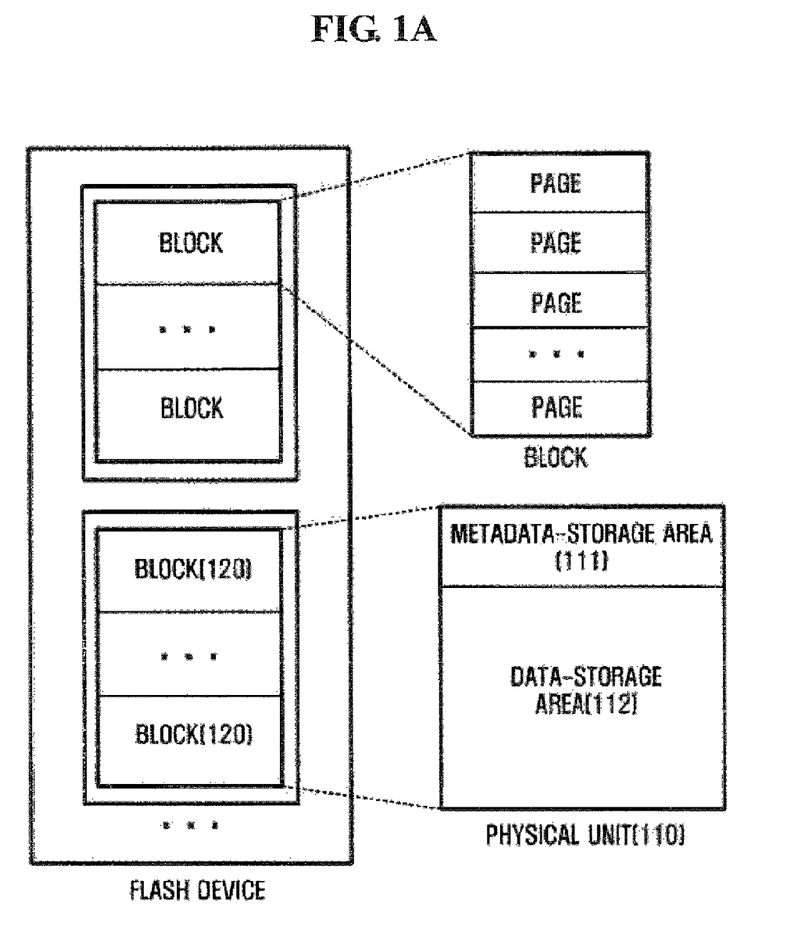
FIGS. 1A through 1C depict a relation of pages, blocks, and units that are located in a flash memory device.
Figure 1B:
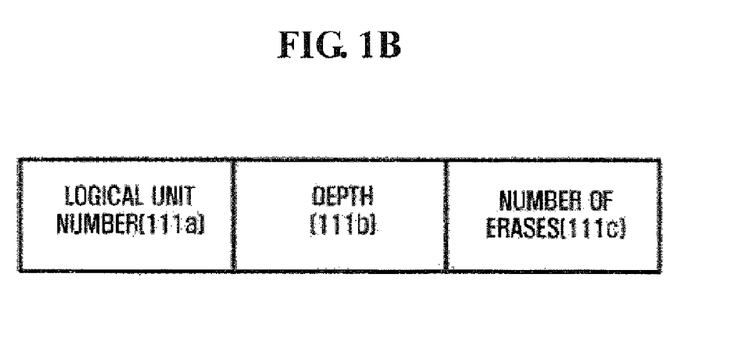
Figure 1C:
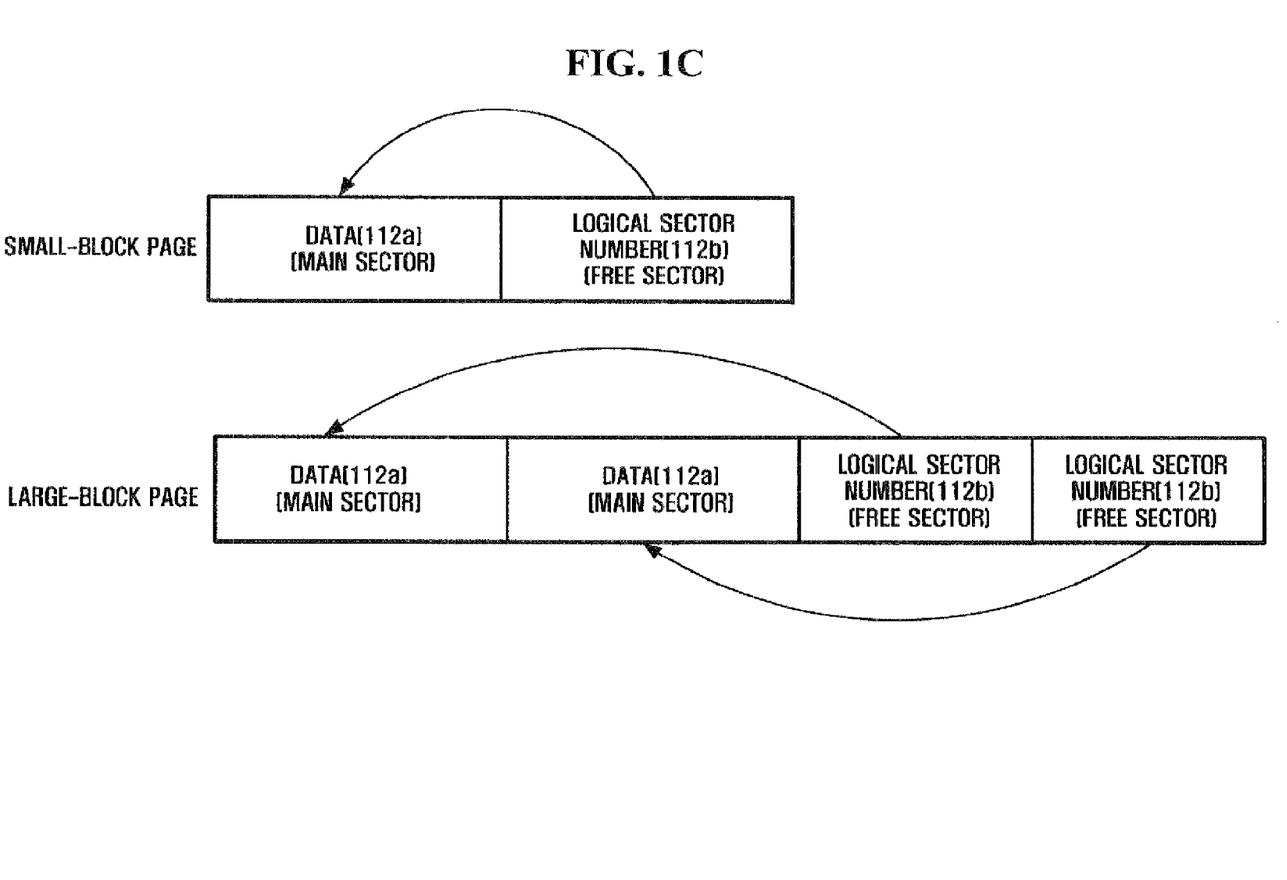

FIGS. 1A through 1C depict a relation of pages, blocks, and units that exist in a flash memory device.

A unit is a logical concept used in the FTL. One physical unit 110 has a plurality of sequential physical blocks 120, and is divided into a metadata-storage area 111 and a data-storage area 112.

The metadata-storage area 111 has a logical unit number 111*a* that is mapped to the physical unit 110, a depth 111*b* showing an age of the physical unit 110, and the number of erases 111*c* of the physical unit 110, as shown in FIG. 1B. For reference, the greater the number of the depth 111*b* is, the later the physical unit has been recorded.

The data-storage area 112 has data 112*a* and a logical sector number 112*b* that is mapped to a corresponding physical sector, as shown in FIG. 1C.

Figure 2:
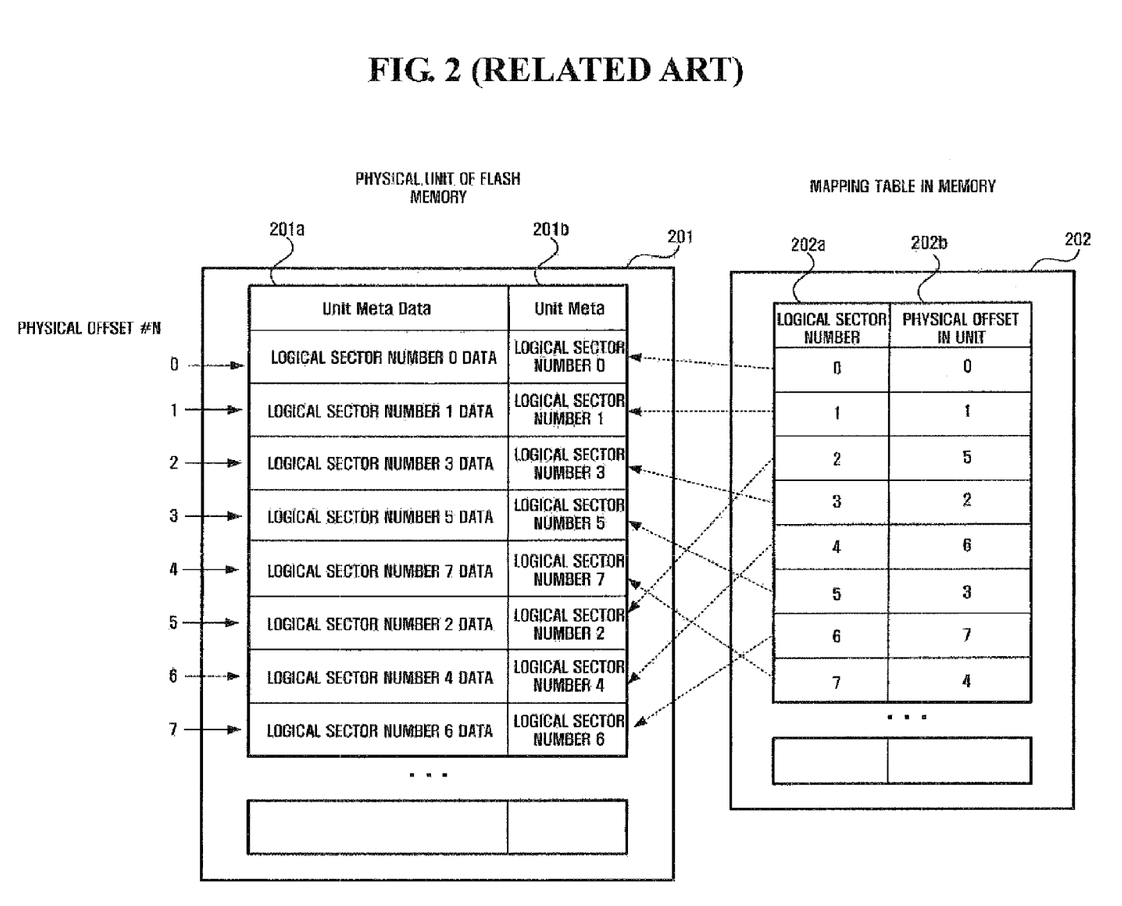
FIG. 2 depicts a mapping relation of a logical sector and physical sector located in a related art physical unit.

FIG. 2 depicts a mapping relation of a logical sector and a physical sector located in a related art physical unit.

In a physical unit 201 of a flash memory, physical sectors storing data 201*a* and information 201*b* on logical sectors mapped to the physical sectors are displayed.

A mapping table 202 stored in a main memory of a system displays logical sector numbers 202*a* and physical offset numbers 202*b* on the physical sectors mapped to the logical sectors.

The logical sector numbers 202*a* showing information on the physical sectors are displayed for convenience, but are not stored in the real mapping table since they may be displayed as indexes of the table.

When the flash memory is initialized, since the related art requires reading the physical sectors that belongs in each physical unit of the flash memory in order to organize mapping of the logical sectors and the physical sectors in each physical unit, it requires a long boot time, which causes performance deterioration of the system.

SUMMARY OF THE INVENTION

The present invention provides an apparatus and method for reorganizing mapping information in the flash memory which can reduce a time spent on mapping reorganization by reducing accesses needed to reorganize physical and logical sectors existing in a flash memory when the flash memory is initialized.

The present invention will become clear to those skilled in the art upon review of the following description, attached drawings and appended claims.

According to an aspect of the present invention, there is provided an apparatus for reorganizing mapping information in a flash memory including a sector-managing module that secures a mapping sector where mapping information is recorded in a physical unit, and determines whether user data is recorded up to a sector located in a predetermined position, and a mapping-information-recording module that records the mapping information in the mapping sector according to a result of the determination, wherein the mapping information comprises a relation of a physical sector where the user data is recorded and a logical sector corresponding to the physical sector.

According to another aspect of the present invention, there is provided an apparatus for reorganizing mapping information in a flash memory including a mapping-information-obtaining module that obtains mapping information comprising a relation of a physical sector and a logical sector corresponding to the physical sector, and a mapping-information-reorganizing module that searches for last-recorded mapping information of the obtained mapping information, and reorganizes a mapping table for the physical sector and the logical sector.

According to still another aspect of the present invention, there is provided a method of reorganizing mapping information in a flash memory including securing a mapping sector where mapping information is recorded in a physical unit and determining whether user data is recorded up to a sector located in a predetermined position, and recording the mapping information in the mapping sector according to a result of the determination, wherein the mapping information comprises a relation of a physical sector storing the user data and a logical sector corresponding to the physical sector.

According to another aspect of the present invention, there is provided a method of reorganizing mapping information in a flash memory including obtaining mapping information comprising a relation of a physical sector and logical sector corresponding to the physical sector, and searching for last-recorded mapping information of the obtained mapping information, and reorganizing a mapping table for the physical sector and the logical sector.

BRIEF DESCRIPTION OF THE DRAWINGS

The above and other aspects of the present invention will become apparent by describing in detail preferred embodiments thereof with reference to the attached drawings, in which.

DETAILED DESCRIPTION OF EXEMPLARY EMBODIMENTS

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implements the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which includes one or more executable instructions for implementing the specified logical function(s).

It should also be noted that in some alternative implementations, the functions noted in the blocks may occur out of order.

For example, two blocks shown in succession may in fact be executed substantially concurrently or the blocks may sometimes be executed in reverse order, depending upon the functionality involved.

Figure 3:
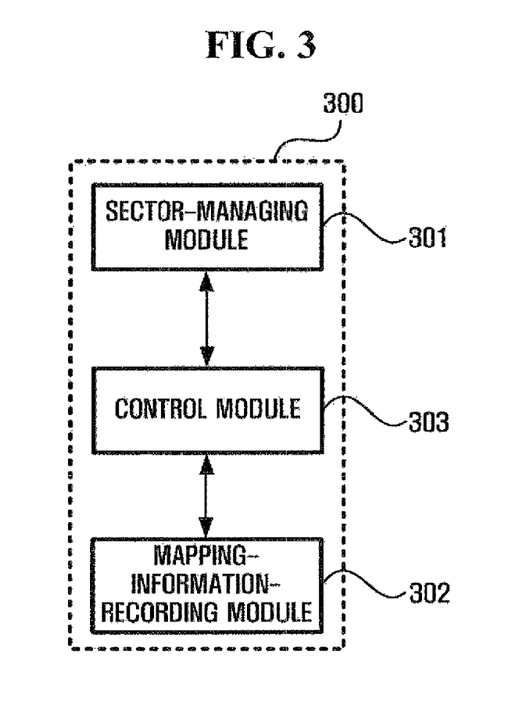
FIG. 3 is a view showing a configuration of a device for a reorganization of mapping information in a flash memory according to an exemplary embodiment of the present invention.

FIG. 3 is a view showing a configuration of a device for reorganization of mapping information in a flash memory according to an exemplary embodiment of the present invention.

An apparatus 300 for reorganizing mapping information in a flash memory includes a sector-managing module 310 that secures a sector in which user data is recorded in a physical unit and a sector in which mapping information is recorded in the physical unit, and determines whether the user data is recorded up to a sector located at a predetermined position. The apparatus also includes a mapping-information-recording module 302 that records and stores mapping information indicating a relation between a physical sector where the user data is recorded and a logical sector corresponding to the physical sector, and a control module 303 that controls each module.

The term "unit", as used herein, means, but is not limited to, a software or hardware component, such as a Field Programmable Gate Array (FPGA) or an Application Specific Integrated Circuit (ASIC), which performs certain tasks.

A module may advantageously be configured to reside in the addressable storage medium and configured to execute in one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

The sector-managing module 301 obtains information on a user-data-storing sector and a mapping-information-storing sector in a physical unit, and determines whether user data is recorded up to a sector located at a predetermined position.

If the user data is recorded up to a sector located at the predetermined position, the sector-managing module 301 calls the mapping-information-recording module 302 in order for it to record mapping information.

Here, the "sector located at the predetermined position" means one of user-data-storing sectors in the physical unit. The mapping-information storing sector where mapping information is recorded by the mapping-information-recording module 302 (described later) is an N-th sector and the "sector located at the predetermined position" is an (N−1)-th sector.

The "sector located at the predetermined position" will be described in detail in the description of the mapping-information-recording module 302.

The sector-managing module 301 determines whether a free sector exists in a physical unit.

If a free sector does not exist, the sector-managing module 301 secures a new block, and then secures a user-data-storing sector where user data is recorded and a mapping-information-storing sector where mapping information is recorded in the new block.

Figure 4A:
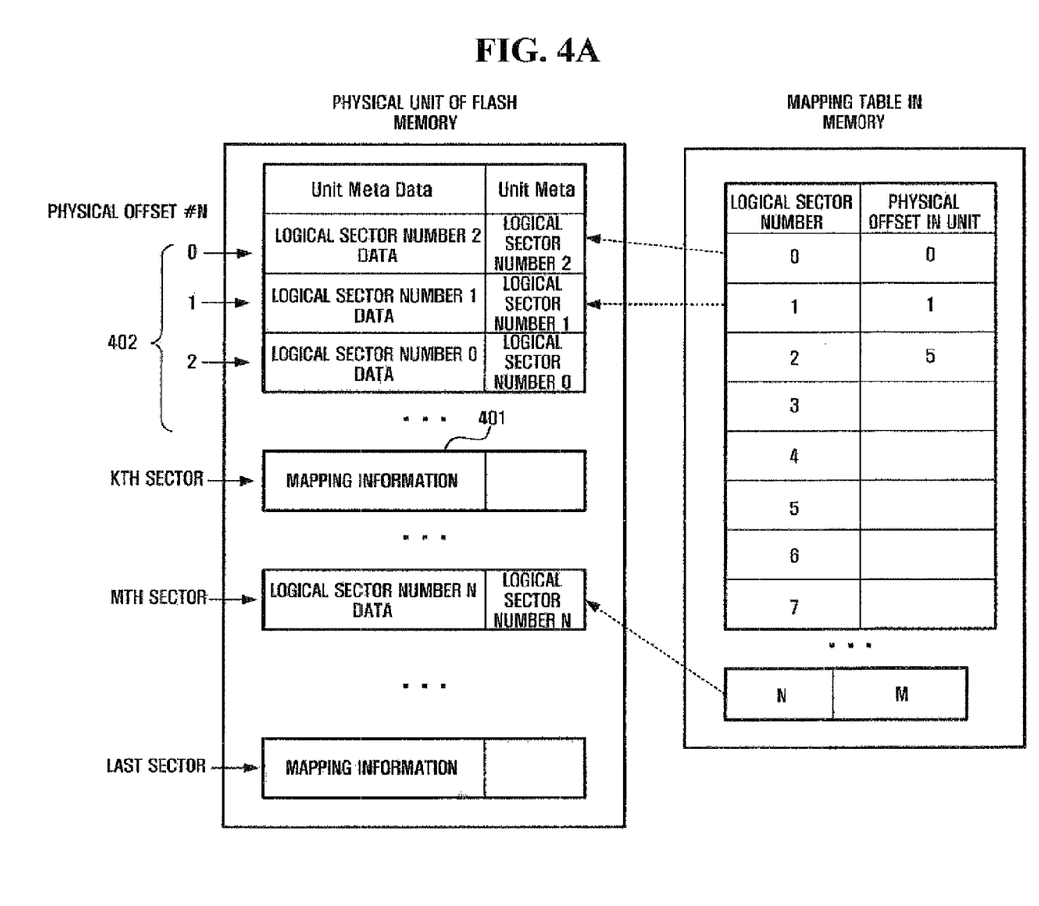
FIG. 4A depicts a mapping relation of a logical sector and physical sector located in a physical unit according to an exemplary embodiment of the present invention.

FIG. 4A depicts a mapping relation of a logical sector and a physical sector located in a physical unit according to an exemplary embodiment of the present invention.

According to the determined result of the sector-managing module 301, the mapping-information-recording module 302 records the relation of the logical sector and the physical sector in a mapping-information-storing sector in the physical unit.

The mapping-information-storing sector where the mapping information is recorded by the mapping-information-recording module 302 is called a "mapping sector". A mapping sector 401 is located at another predetermined position in the physical unit and the number of mapping sectors is predetermined.

That is, the sector in which the mapping information is recorded is the mapping sector 401.

Here, the "mapping information" includes logical sector numbers mapped to physical sector numbers.

For reference, the user-data-storing sector is called "data sectors" 402.

Mapping sectors including the mapping sector 401 can be arranged on each specific sector position in a physical unit in order to reduce a sector-reorganizing time.

When the mapping sector 401 is a K-th sector in the physical unit, the mapping information recorded in the mapping sector 401 includes mapping information on logical sectors corresponding to the data sectors 402 which have physical offset numbers 1 through K−1 in the physical unit. The mapping-information-recording module 302 cumulatively records mapping information on sectors 1 through K−1 in the mapping sector 401.

The number of mapping sectors in one physical block can be one through N (N is a half of the number of sectors that exit in a block).

Figure 4B:
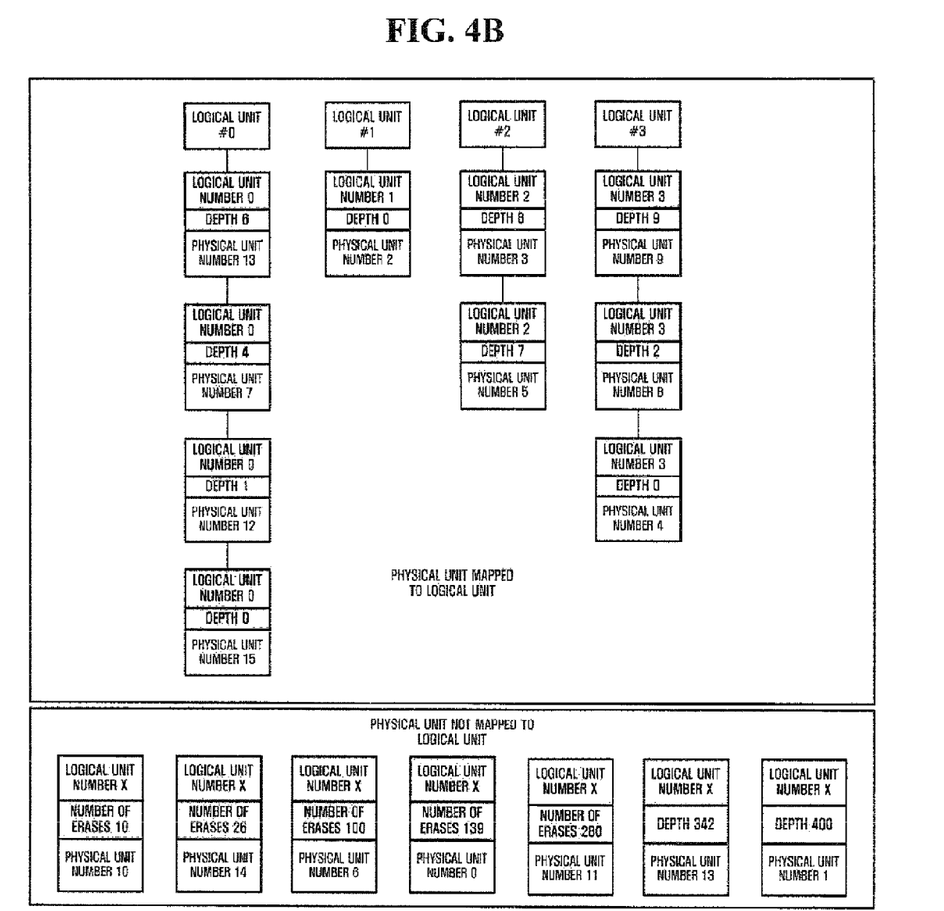
FIG. 4B depicts a mapping relation of a logical unit and physical unit according to an exemplary embodiment of the present invention.

FIG. 4B depicts a mapping relation of a logical unit and a physical unit according to an exemplary embodiment of the present invention.

Physical units 13, 7, 12, and 15 are mapped to a logical unit 0. The greater the depth number of a physical unit, the later recorded is the data stored in the physical unit.

Similarly, a physical unit 2 is mapped to a logical unit 1, physical units 3 and 5 are mapped to a logical unit 2, and physical units 9, 8, and 4 are mapped to a logical unit 3.

Physical units 10, 14, 6, 0, 11, 13, and 1 are not mapped to a logical unit.

Figure 5:
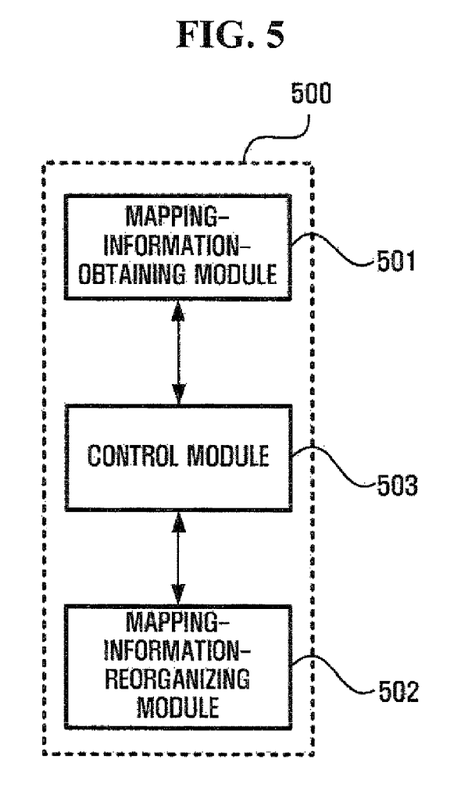
FIG. 5 is a view showing a configuration of a device for a reorganization of mapping information in a flash memory according to another exemplary embodiment of the present invention.

FIG. 5 is a view showing a configuration of a device for a reorganization of mapping information in a flash memory according to another exemplary embodiment of the present invention.

An apparatus for reorganizing mapping information in the flash memory includes a mapping-information-obtaining module 501 that obtains mapping information showing a relation of a physical sector and a logical sector corresponding to the physical sector when reorganizing a mapping table, a mapping-information-reorganizing module 502 that reorganizes the mapping table by searching for the latest mapping information of the obtained mapping information, and a control module 503 that controls each module.

The mapping-information-obtaining module 501 obtains mapping information showing the relation of the physical sector and the logical sector corresponding to the physical sector when reorganizing the mapping table.

Since the mapping-information-recording module 302 illustrated in FIG. 3 cumulatively records mapping information on sectors 1 through K−1 when mapping information is recorded in a K-th sector, the mapping-information-obtaining module 501 searches for a mapping sector on which mapping information is recorded last in the physical unit in order to find the latest mapping information.

The mapping-information-reorganizing module 502 reorganizes mapping information through the latest mapping information, and applies the reorganized mapping information to a mapping table.

Figure 6:
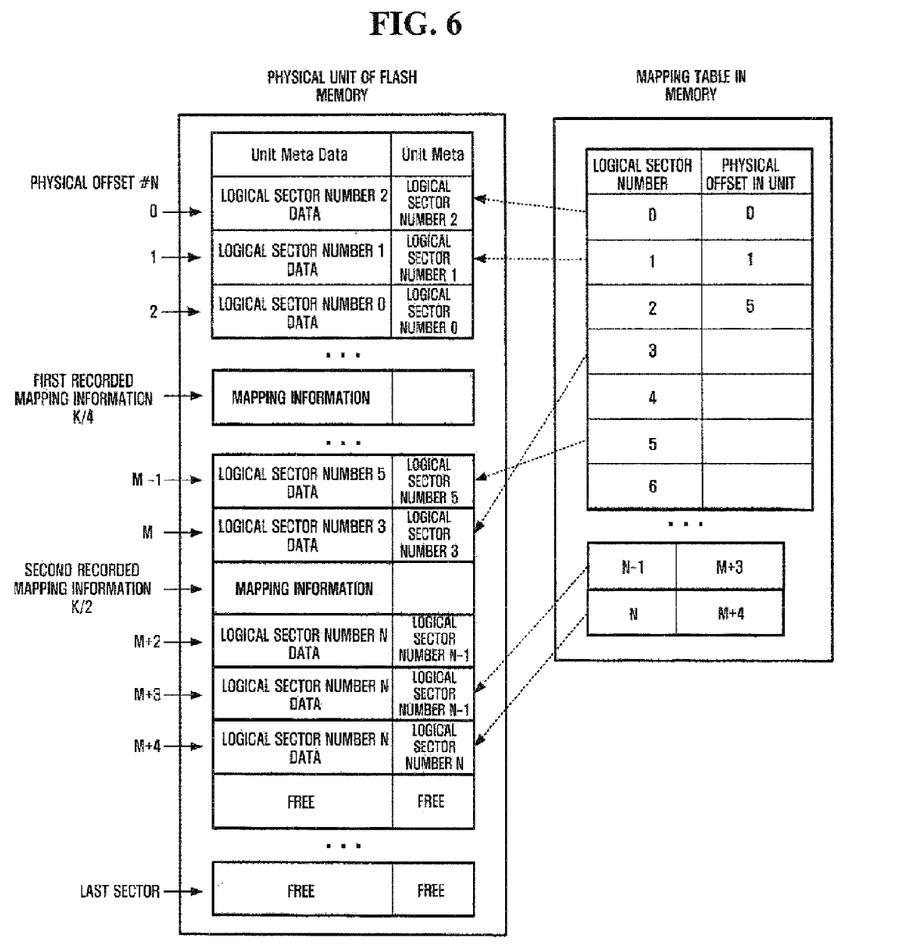
FIG. 6 depicts mapping information on a logical sector and physical sector located in a physical unit according to an exemplary embodiment of the present invention.

FIG. 6 depicts mapping information on a logical sector and a physical sector located in a physical unit according to an exemplary embodiment of the present invention.

It is assumed that the number of physical sectors in a physical unit is K, and that mapping information is written in a (K/4)-th sector, a (K/2)-th sector, and a (3K/4)-th sector, i.e., three sectors.

Also, it is assumed that data has been written up to an (M+4)-th sector, and K/2=M+1.

The mapping-information-obtaining module 501 searches for the latest-recorded mapping sector that exists in the physical unit in order to reorganize mapping of logical sectors to corresponding physical sectors in the physical unit.

A method for reducing accesses to a NAND operation is selected as a searching method. A binary search is used as an example.

The mapping-information-obtaining module 501 determines if mapping information exists in the (K/2)-th sector in the unit, and if mapping information exists in the (K/2)-th sector, and then determines if mapping information exists in the (3K/4)-th sector.

If mapping information exists in the (3K/4)-th sector, the (3K/4)-th sector is the latest-recorded mapping sector. If mapping information does not exist in the (3K/4)-th sector, the (K/2)-th sector is the latest-recorded mapping sector.

When mapping information does not exist in the (K/2)-th sector, the mapping-information-obtaining module 501 determines whether mapping information exists in the (K/4)-th sector.

If mapping information exists in the (K/4)-th sector, the (K/4)-th sector is the latest-recorded mapping sector. If mapping information does not exist in the (K/4)-th sector, the mapping-information-obtaining module 501 recognizes that the mapping sector has not yet been recorded in the unit.

If it is recognized that the (K/2)-th sector is the latest recorded mapping sector through the binary search, the mapping-information-obtaining module 501 obtains information on the sectors prior to the (K/2)-th sector, and the mapping-information-reorganizing module 502 reorganizes a mapping table of physical sectors and logical sectors based on the information on the sectors prior to the (K/2)-th sector obtained by the mapping-information-obtaining module 501.

The logical-sector-mapping information on zeroth (0-th) through M(K/2−1)-th sectors are recorded in the (K/2)-th sector.

The mapping-information-reorganizing module 502 obtains mapping information on the physical sectors corresponding to an (M+2)-th sector through an (M+4)-th sector by directly reading a logical sector number (LSN) recorded in a spare area of a corresponding sector, and applies it to the mapping table.

When user data is recorded in a physical unit, an exemplary embodiment of the present invention discloses recording of mapping information on logical sectors and physical sectors in a predetermined position, and reorganizing mapping of the physical sectors and the logical sectors in the flash memory using the recorded mapping information.

Here, the number and the position of sectors storing mapping information in the physical unit can be controlled at a system user's option or a developer's option.

Figure 7:
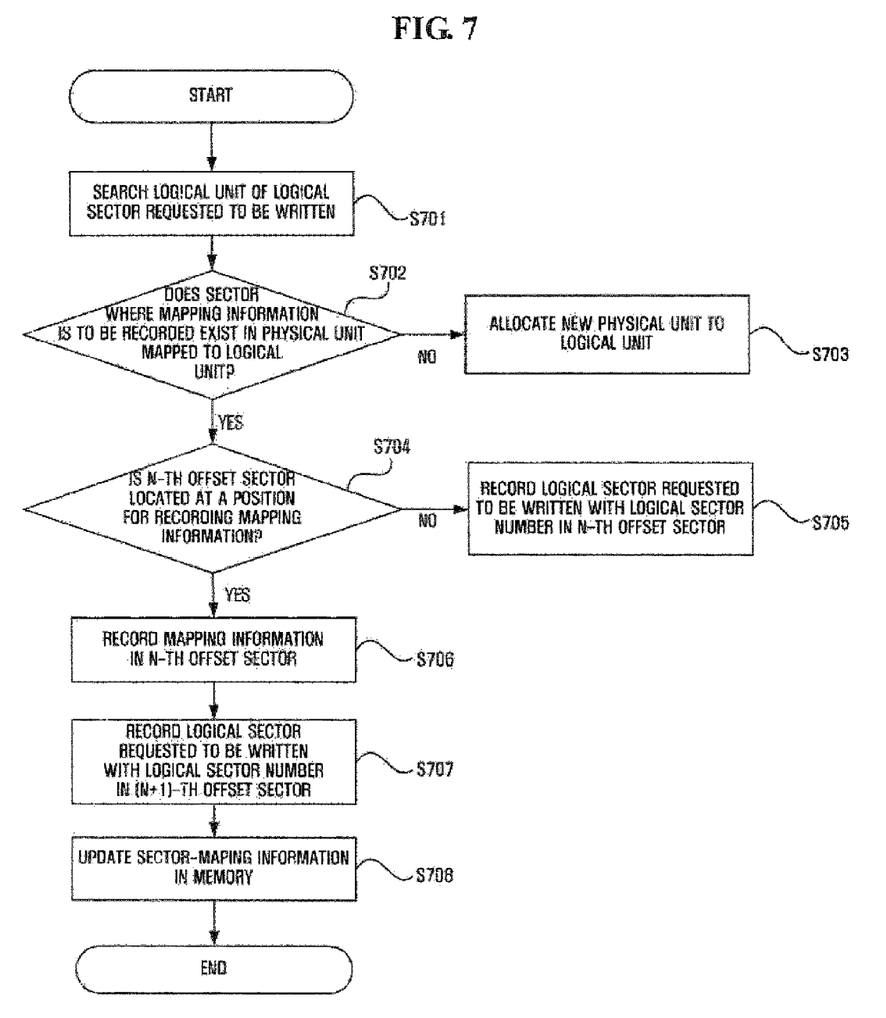
FIG. 7 is a flowchart of a writing process of a data sector including a mapping information sector according to an exemplary embodiment of the present invention.

By using the mapping information that exists in a predetermined position of the physical unit, a method of minimizing a time to be spent on reorganizing mapping information required to re-operate the flash memory is described in FIGS. 6 and 7.

FIG. 7 is a flowchart of a process of writing a data sector and a mapping sector according to an exemplary embodiment of the present invention.

When an FTL receives a request for writing a data sector, the sector-managing module 301 searches for a logical unit for a logical sector of the data sector requested to be written (S701).

After operation S701, the sector-managing module 301 determines whether a free sector exists in a physical unit mapped to the logical unit (S702).

If a free sector does not exist in the physical unit in S702, the sector-managing module 301 allocates a new physical unit to the logical unit, and secures a sector where user data is recorded and a sector where mapping information is recorded in a block of the allocated physical unit (S703).

If a free sector exists in the physical unit in S702, the sector-managing module 301 determines whether user data is recorded up to a sector located at a predetermined position. That is, the sector-managing module 301 determines whether an N-th offset sector of the physical unit is located at a position for recording mapping information (S704).

Here, the "sector located at a predetermined position" means one of user-data-storing sectors in the physical unit. The mapping-information-storing sector where mapping information is recorded by the mapping-information-recording module 302, which will be described, is the N-th sector and the "sector located at a predetermined position" is an (N−1)-th sector.

If the offset number N of the physical sector is not the position for recording mapping information, the mapping-information-recording module 302 records the logical sector requested to be written in the N-th offset sector of the physical unit with a corresponding LSN (S705).

If the N-th offset sector of the physical unit is the position for recording mapping information, the mapping-information-recording module 302 records logical-sector-mapping information on zeroth (0-th) through (N−1)-th offset sectors in the N-th offset sector of the physical unit (S706).

After operation S706, the mapping-information-recording module 302 records the logical sector requested to be written in the (N+1)-th offset sector of the physical unit with a corresponding LSN (S707), and updates the sector-mapping information on the flash memory (S708).

Figure 8:
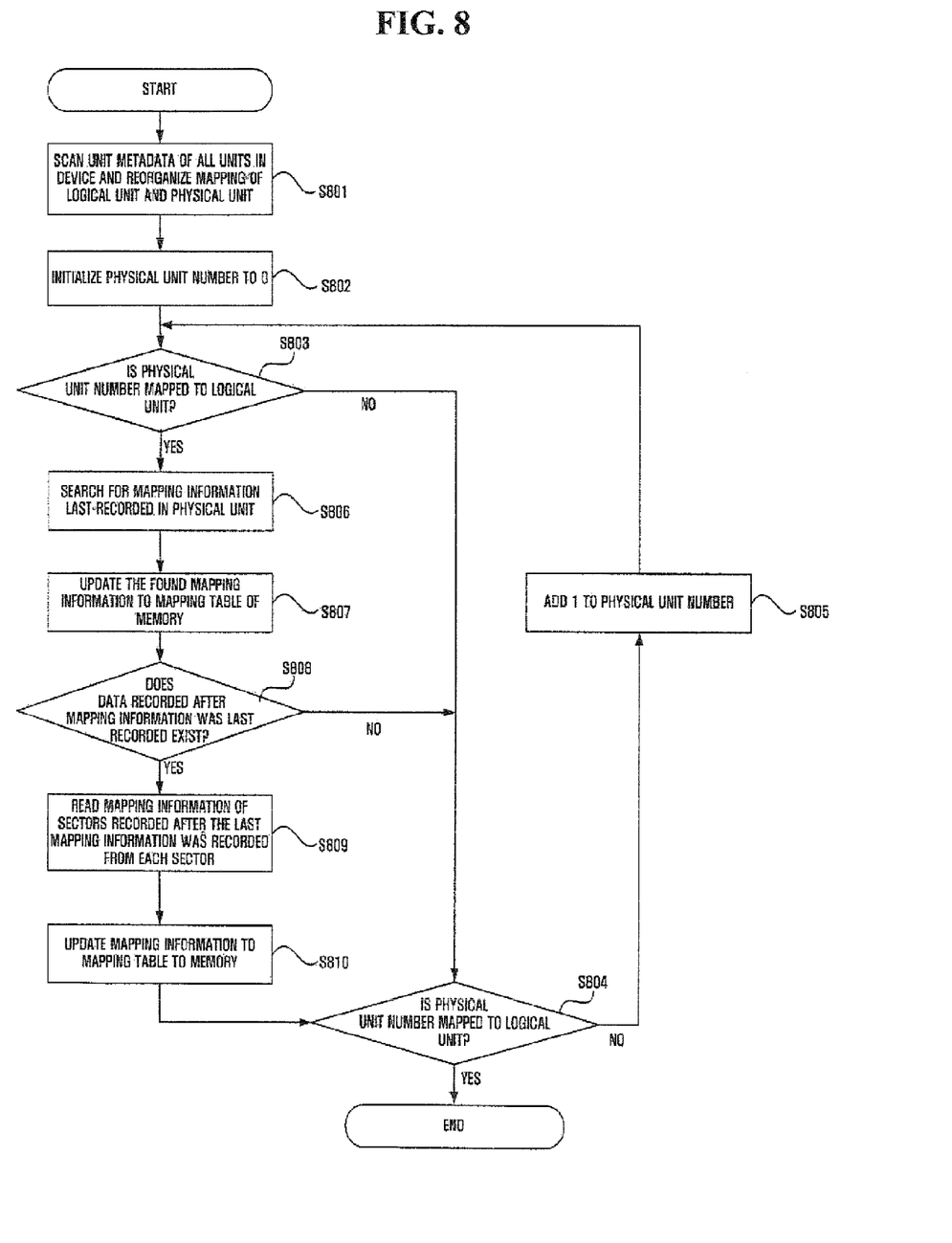
FIG. 8 is a flowchart of a reorganization of mapping information when a flash memory is initialized according to an exemplary embodiment of the present invention.

FIG. 8 is a flowchart of reorganization of mapping information when a flash memory is initialized according to an exemplary embodiment of the present invention.

The reorganization of mapping is divided into first-level mapping that reads and reorganizes mapping information on logical units and physical units and second-level mapping that reorganizes mapping of logical sectors and physical sectors within each physical unit.

The second-level mapping, i.e., the reorganization of mapping logical sectors and physical sectors within each physical unit is performed in a direction of reading the least number of physical data in reference with mapping information within the physical unit.

Through scanning of metadata of all physical units within a device, mapping information of logical units and physical units is reorganized (S801).

After operation S801, the mapping-information-reorganizing module 502 performs S802 through S810 for all physical units mapped to a logical unit in order to reorganize mapping of physical sectors and logical sectors within each physical unit.

The mapping-information-obtaining module 501 initializes a physical unit number to zero (0) (S802), and determines whether the physical unit number is mapped to the logical unit (S803).

If the physical unit number is not mapped to the logical unit, the mapping-information-obtaining unit 501 checks whether the physical unit number is the last physical unit number of the device (S804). If the physical unit number is the last physical unit number of the device, the operation is ended.

In operation S805, if the physical unit number is not the last physical unit number of the device, the mapping-information-reorganizing module 303 adds one (1) to the physical unit number, and repeats operation S803 for a next physical unit.

If the physical unit number was mapped to the logical unit, the mapping-information obtaining module 501 searches for a mapping sector (e.g., a K-th sector) that is lastly recorded in the physical unit (S806).

The mapping-information-reorganizing module 502 updates a mapping table of the memory (S807), and determines if other data was recorded after mapping information was recorded lastly on the mapping sector (S808).

For reference, since a position where the mapping information is recorded is fixed, it is possible to search for the mapping sector that is lastly recorded in the physical unit by performing a NAND access one (1) to N times (N is the number of predetermined mapping sectors in a corresponding physical unit).

If there is no data recorded after that the mapping information was lastly recorded, operation S804 is repeated.

If other data was recorded after that the mapping information had been lastly recorded, the mapping-information-reorganizing module 502 reorganizes mapping information of data sectors recorded up to an (K−1)-th sector using data stored in the mapping sector (K-th sector) that was lastly recorded (S809).

After operation S809, if there are other data sectors recorded after the K-th sector, the mapping-information-reorganizing module 503 updates mapping information for the other sectors in the mapping information reorganized in operation S809 (S810).

Then, the mapping-information-reorganizing module 503 repeats operation S804.

The above process is an exemplary embodiment, and a method of searching for the number and the position of the mapping information sectors stored in a physical unit and the latest mapping information sector can be optionally selected, and the present invention is not limited thereto.

As described above, the apparatus and method for reorganizing mapping information in the flash memory according to the present invention produces one or more of the effects described below.

When the flash memory is initialized, it is possible to minimize a performance deterioration of the system by reducing accesses needed to reorganize physical and logical sectors located within a physical unit.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for reorganizing mapping information in a flash memory comprising a physical unit comprising a plurality of physical sectors having sequential offset numbers, the apparatus comprising:
    a sector-managing module that secures at least one mapping sector from among the plurality of physical sectors, and determines whether data is recorded up to a predetermined physical sector, among the plurality of sectors, having an offset number immediately below an offset number of a mapping sector among the at least one mapping sector; and
    a mapping-information-recording module which records, on the mapping sector, mapping information indicating a respective relation of at least one physical sector, having an offset number equal to or less than the offset number of the predetermined physical sector, among the plurality of physical sectors, and at least one logical sector corresponding to the at least one physical sector, if the sector-managing module determines that the data is recorded up to the predetermined physical sector,
    wherein the at least one physical sector is a sector having an offset number 0 through a sector having an offset number N−1, and the mapping sector is a sector having an offset number N in the physical unit, where N is an integer greater than 1, and a number of the plurality of physical sectors of the physical unit is greater than N, and
    wherein the mapping sector is used such that, for reorganizing or updating the mapping information during initialization of the flash memory, the mapping sector is referred to without reading all of the plurality of sectors.

2. The apparatus of claim 1, wherein the physical unit comprises a predetermined number of mapping sectors including the mapping sector and positions of the plurality of mapping sectors are predetermined, and
    wherein the predetermined number of mapping sectors are separated from one another at a given interval in the physical unit.

3. The apparatus of claim 1, wherein the sector-managing module secures a new block in another physical unit of the flash memory if a free sector does not exist in the physical unit, and secures the mapping sector in the new block.

4. The apparatus of claim 1, wherein a number of the at least one mapping sector is two or more, and
    wherein the mapping-information-recording module records respective mapping information on each of the two or more mapping sectors such that a mapping sector having a highest offset number among the two or more mapping sectors cumulatively records mapping information recorded in a remainder of the two or more mapping sectors.

5. The apparatus of claim 1, wherein the sector-managing module secures the sector having the offset number N as the mapping sector,
    wherein, if the sector-managing module determines that the data is not recorded up to the sector having the offset number N−1, the mapping-information-recording module records a logical sector requested to be written on a physical sector, having an offset number less than the offset number N−1, along with a corresponding logical sector number.

6. The apparatus of claim 5, wherein, after recording the mapping information on the mapping sector which is the sector having the offset number N, the mapping-information-recording module records another logical sector requested to be written on a physical sector, having an offset number N+1, along with a corresponding logical sector number.

7. An apparatus for reorganizing mapping information in a flash memory comprising a physical unit comprising a plurality of physical sectors, the apparatus comprising:
    a mapping-information-obtaining module which determines if a number of the physical unit is mapped to a logical unit, and, if the number of the physical unit is mapped to the logical unit, obtains respective mapping information from a plurality of mapping sectors secured from among the plurality of physical sectors, wherein each of the mapping sectors records mapping information indicating a relation of at least one physical sector, among the plurality of physical sectors, and at least one corresponding logical sector; and
    a mapping-information-reorganizing module which searches for last-recorded mapping information among the obtained respective mapping information, and reorganizes a mapping table based on the last-recorded mapping information,
    wherein the mapping-information-obtaining module obtains the last-recorded mapping information from one of the plurality of mapping sectors that is lastly recorded in the physical unit of the flash memory,
    wherein, in order to obtain the last-recorded mapping information from the lastly recorded mapping sector, the mapping-information-obtaining module performs a binary search operation with respect to the plurality of mapping sectors,
    wherein the binary search operation comprises examining a middle-positioned mapping sector among the plurality of mapping sectors to determine if the middle-positioned mapping sector comprises corresponding mapping information, examining a mapping sector positioned after the middle-positioned mapping sector among the plurality of mapping sectors, if it is determined that the middle-positioned mapping sector comprises the corresponding mapping information, and examining a mapping sector positioned before the middle-positioned mapping sector, if it is determined that the middle-positioned mapping sector does not comprise the corresponding mapping information, and wherein, in order to locate the one of the plurality of mapping sectors, the mapping-information-obtaining module searches the plurality of mapping sectors before searching any data sector in the physical unit.

8. The apparatus of claim 7, wherein the mapping-information-reorganizing module reorganizes mapping information in reference to the lastly recorded mapping sector, and applies the reorganized mapping information to the mapping table.

9. The apparatus of claim 7, wherein the mapping information comprises logical sector numbers mapped to physical sector numbers in a one-to-one manner.

10. The apparatus of claim 7, wherein, after the reorganization of the mapping table, the mapping-information-reorganizing module determines if other data is recorded after the last-recorded mapping information is recorded, and wherein, if it is determined that the other data is recorded after the last-recorded mapping information is recorded, the mapping-information-reorganizing module updates the mapping table by reading sectors where the other data is recorded.

11. A method of reorganizing mapping information in a flash memory comprising a physical unit comprising a plurality of physical sectors, the method comprising:

securing at least one mapping sector from among the plurality of physical sectors, and determining whether data is recorded up to a predetermined physical sector, among the plurality of sectors, having an offset number immediately below an offset number of a mapping sector among the at least one mapping sector; and recording, on the mapping sector, mapping information indicating a respective relation of at least one physical sector, having an offset number equal to or less than the offset number of the predetermined physical sector, among the plurality of physical sectors, and at least one logical sector corresponding to the at least one physical sector, if it is determined that the data is recorded up to the predetermined physical sector, wherein the at least one physical sector is a sector having an offset number 0 through a sector having an offset number N−1, and the mapping sector is a sector having an offset number N in the physical unit, where N is an integer greater than 1, and a number of the plurality of physical sectors of the physical unit is greater than N, and wherein the mapping sector is used such that, for reorganizing or updating the mapping information during initialization of the flash memory, the mapping sector is referred to without reading all of the plurality of sectors.

12. The method of claim 11, wherein the physical unit comprises a predetermined number of mapping sectors including the mapping sector and positions of the plurality of mapping sectors are predetermined, and wherein the predetermined number of mapping sectors are separated from one another at a given interval in the physical unit.

13. The method of claim 11, wherein the managing of sectors secures a new block in another physical unit of the flash memory when a free sector does not exist in the physical unit, and secures the mapping sector in the new block.

14. The method of claim 11, wherein a number of the at least one mapping sector is two or more, and wherein the recording of mapping information comprises recording respective mapping information on each of the two or more mapping sectors such that a mapping sector having a highest offset number among the two or more mapping sectors cumulatively records mapping information recorded in a remainder of the two or more mapping sectors.

15. The method of claim 11, further comprising:

securing the sector having the offset number N as the mapping sector, and recording a logical sector requested to be written on a physical sector, having an offset number less than the offset number N−1, along with a corresponding logical sector number, if it is determined that the data is not recorded up to the sector having the offset number N−1.

16. The method of claim 15, further comprising, after the recording the mapping information on the mapping sector which is the sector having the offset number N, recording another logical sector requested to be written on a physical sector, having an offset number N+1, along with a corresponding logical sector number.

17. A method for reorganizing mapping information in a flash memory comprising a physical unit comprising a plurality of physical sectors, the method comprising:

determining if a number of the physical unit is mapped to a logical unit;

if the number of the physical unit is mapped to the logical unit, obtaining respective mapping information from a plurality of mapping sectors secured from among the plurality of physical sectors, wherein each of the mapping sectors records mapping information indicating a relation of at least one physical sector, among the plurality of physical sectors, and at least one corresponding logical sector; and searching for last-recorded mapping information among the obtained respective mapping information, and reorganizing a mapping table based on the last-recorded mapping information, wherein the last-recorded mapping information is obtained from one of the plurality of mapping sectors that is lastly recorded in the physical unit of the flash memory, wherein, in order to obtain the last-recorded mapping information, a binary search operation is performed with respect to the plurality of mapping sectors, wherein the binary search operation comprises examining a middle-positioned mapping sector among the plurality of mapping sectors to determine if the middle-positioned mapping sector comprises corresponding mapping information, examining a mapping sector positioned after the middle-positioned mapping sector among the plurality of mapping sectors, if it is determined that the middle-positioned mapping sector comprises the corresponding mapping information, and examining a mapping sector positioned before the middle-positioned mapping sector, if it is determined that the middle-positioned mapping sector does not comprise the corresponding mapping information, and wherein, in order to locate the one of the plurality of mapping sectors, the plurality of mapping sectors are searched before searching any data sector in the physical unit.

18. The method of claim 17, wherein the reorganizing of the mapping table comprises reorganizing mapping information in reference to the lastly recorded mapping sector, and applying the reorganized mapping information to the mapping table.

19. The method of claim 17, wherein the mapping information comprises logical sector numbers mapped to physical sector numbers in a one-to-one manner.

20. The method of claim 17, further comprising:
   after the reorganizing the mapping table, determining if other data is recorded after the last-recorded mapping information is recorded, and
   updating the mapping table by reading sectors where the other data is recorded, if it is determined that the other data is recorded after the last-recorded mapping information is recorded.

* * * * *